(12) United States Patent
Chitnis et al.

(10) Patent No.: US 8,582,745 B1
(45) Date of Patent: Nov. 12, 2013

(54) SIMULTANEOUS MUTUAL CALL HANDLING

(71) Applicant: Verizon Patent and Licensing Inc., Basking Ridge, NJ (US)

(72) Inventors: Siddharth Chitnis, Irving, TX (US); Marcelo D. Lechner, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/742,985

(22) Filed: Jan. 16, 2013

(51) Int. Cl.
  *H04M 3/42* (2006.01)
(52) U.S. Cl.
  USPC .................................................. 379/207.05
(58) Field of Classification Search
  USPC .............. 379/207.05, 207.06, 207.07, 211.04
  See application file for complete search history.

(56) References Cited

U.S. PATENT DOCUMENTS

| | | | | |
|---|---|---|---|---|
| 5,303,290 | A * | 4/1994 | Redberg et al. | 379/241 |
| 8,406,406 | B2 * | 3/2013 | Kim et al. | 379/207.05 |
| 8,442,201 | B2 * | 5/2013 | Kudo | 379/207.05 |

* cited by examiner

*Primary Examiner* — Ahmad Matar
*Assistant Examiner* — Oleg Asanbayev

(57) ABSTRACT

A device detects that a first user device is calling a second user device while the second user device is calling the first user device, and sends a notification to the first user device or the second user device indicating that the first user device and the second user device are calling one another. The device receives a response to the notification indicating that the first user device and the second user device are to be connected for a call, designates the first user device or the second user device as a call originator, and connects the first user device and the second user device for the call.

20 Claims, 10 Drawing Sheets

SIMULTANEOUS MUTUAL CALL HANDLING

BACKGROUND

Communication devices, such as cellular phones and landline telephones, may be used to place calls to other communication devices. When a receiving communication device is connected to a third party, or otherwise engaged, a calling communication device may receive a busy signal indicating that the communication devices are unable to connect.

DETAILED DESCRIPTION OF PREFERRED EMBODIMENTS

The following detailed description of example implementations refers to the accompanying drawings. The same reference numbers in different drawings may identify the same or similar elements.

A first user of a first user device, such as a cellular phone, a smart phone, or a landline telephone, may use the first user device to call a second user of a second user device at the same time that the second user is attempting to call the first user. When two or more user devices attempt to call each other at the same time, each user device may receive a busy signal indicating that the user devices are unable to connect. Implementations described herein may assist user devices attempting to call one another at the same time to connect rather than receive a busy signal.

Figure 1A:
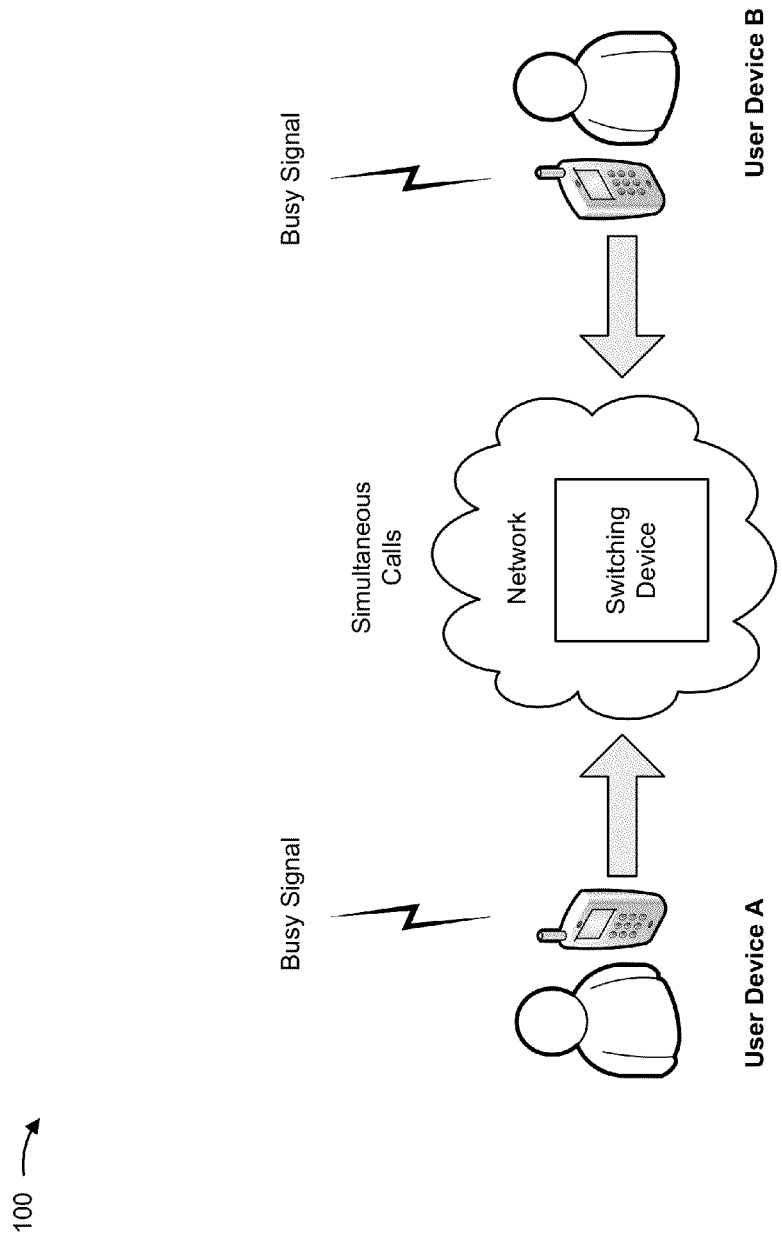
FIGS. 1A and 1B are diagrams of an overview of an example implementation described herein.
Figure 1B:
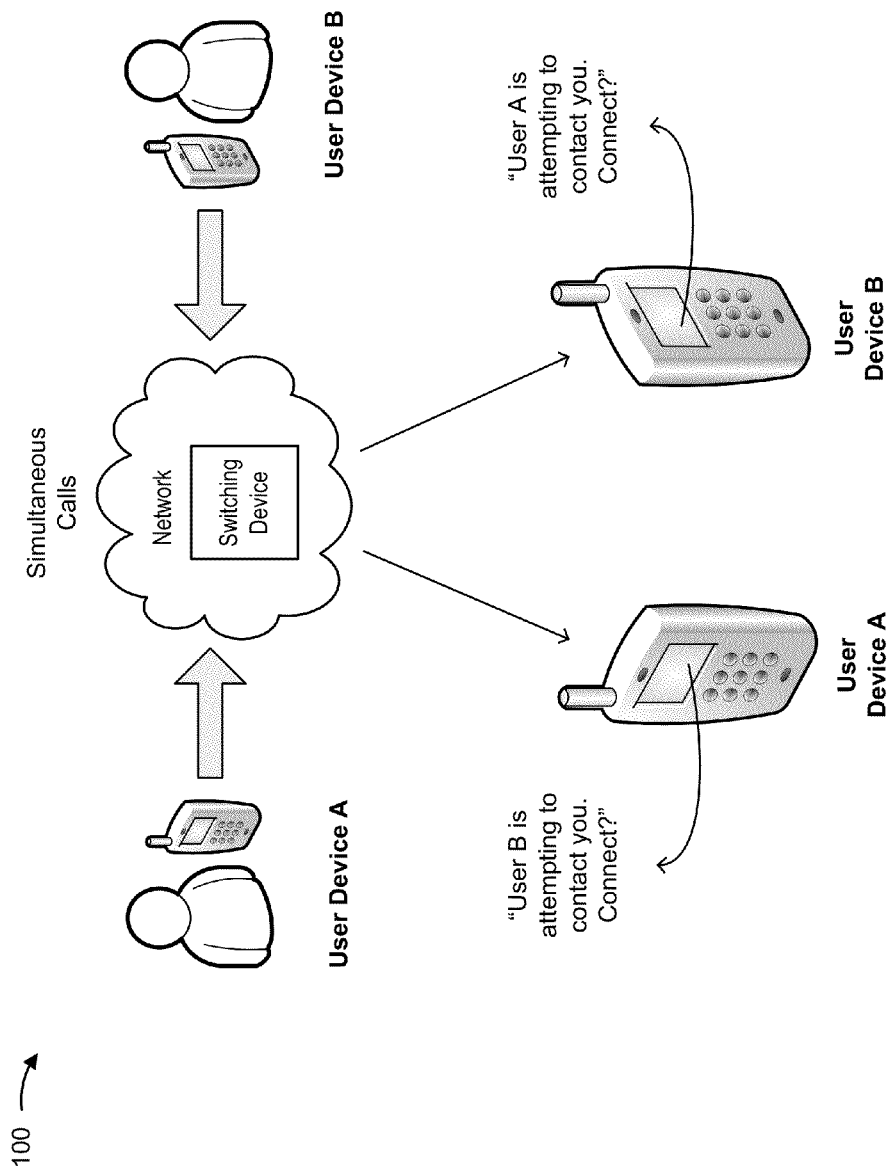

FIGS. 1A and 1B are diagrams of an overview of an example implementation 100 described herein. As shown in FIG. 1A, example implementation 100 may include two user devices, such as two mobile phones, attempting to simultaneously call one another via a network, such as a cellular network. The network may include a switching device, such as a switch or a switching center. The user devices may each be associated with a user, such as user A or user B.

As further shown in FIG. 1A, when the two users (A and B) attempt to call each other simultaneously using the user devices, each user device may receive a busy signal indicating that the user devices are unable to connect. For example, the two users may attempt to call each other simultaneously when a previous connection between the two user devices over a cellular network is lost due to a dropped call. In this situation, both users may immediately attempt to call each other, and the user devices may receive busy signals from the switching device indicating that the user devices are unable to connect.

As shown in FIG. 1B, the switching device may connect the user devices rather than sending a busy signal to the user devices. For example, the switching device may detect the simultaneous calls, and may send a notification to the user devices to determine whether to connect the user devices. As shown, the user devices may display the notification, such as, "User B is attempting to contact you. Connect?" The switching device may receive a response to the notification, indicating that the user devices are to be connected for a call. The switching device may designate a call originator for the call, and may connect the user devices for the call.

Figure 2:
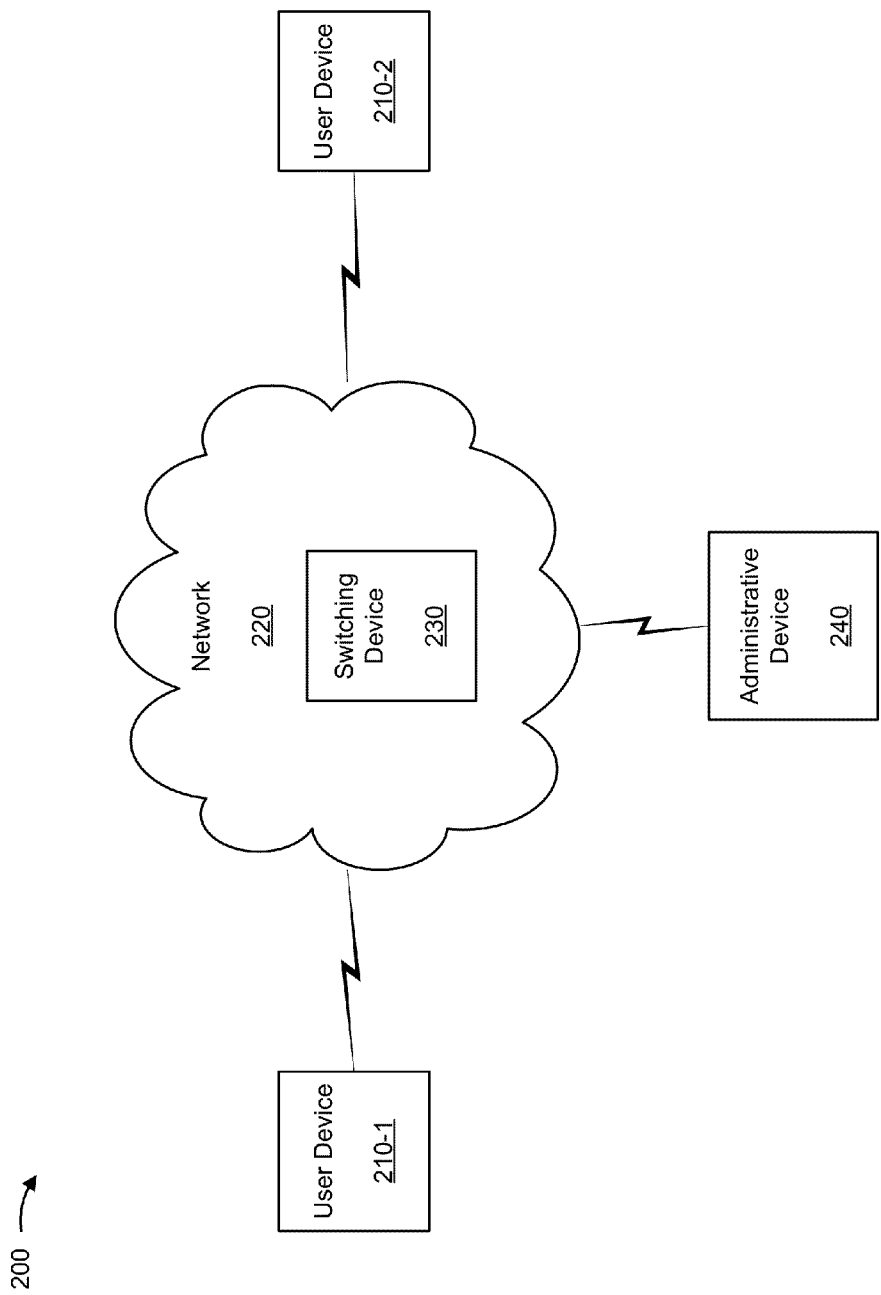
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 and 210-2 (hereinafter referred to collectively as "user devices 210," and individually as "user device 210"), a network 220, a switching device 230, and an administrative device 240.

User device 210 may include a device capable of making and/or receiving calls (e.g., voice and/or video calls). For example, user device 210 may include a mobile phone (e.g., a smart phone, a radiotelephone, etc.), a landline telephone (e.g., a payphone, a home telephone, etc.), a computing device (e.g., a desktop computer, a laptop computer, a tablet computer, a handheld computer, etc.), or a similar device. In some implementations, user device 210 may include a display that outputs information from user device 210 and/or that allows a user to provide input to user device 210. Additionally, or alternatively, user device 210 may receive information from and/or transmit information to switching device 230 and/or administrative device 240. User device 210 may be associated with a user. As used herein, a user may refer to user device 210 and/or a user of user device 210.

Network 220 may include one or more wired and/or wireless networks. For example, network 220 may include a cellular network, a public land mobile network ("PLMN"), a second generation ("2G") network, a third generation ("3G") network, a fourth generation ("4G") network, a fifth generation ("5G") network, a long term evolution ("LTE") network, and/or another network. Additionally, or alternatively, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Switching device 230 may include a device capable of connecting user devices 210 for a call. For example, switching device 230 may include a switch that is operated manually ("manual switch"), a switch that is operated electronically ("electronic switch"), a switch that is operated remotely ("remote switch"), a device capable of switching between one or more long-distance calls ("tandem switch"), a device capable of switching between two or more analog circuits ("analog switch"), a device capable of switching between two or more digital circuits ("digital switch"), a device capable of connecting calls from two or more user devices using internet protocol ("softswitch"), and/or a combination of these or other types of switching devices. Additionally, or alternatively, switching device 230 may include a server, a gateway, a router, a hub, a bridge, an optical add-drop multiplexer ("OADM"), a base station, and/or a network interface card ("NIC"). In some implementations, switching device 230 may be associated with a central office servicing user device 210-1 or user device 210-2. In some implementations, switching device 230 may communicate with user device 210 by transmitting a notification of simultaneous calls to user device 210, and receiving a response to the notification. Additionally, or alternatively, switching device 230 may communicate with administrative device 240 to provide and/or receive call information.

Administrative device 240 may include one or more devices capable of receiving, analyzing, and/or processing call information. For example, administrative device 240 may include a computing device, such as a server, a desktop computer, a laptop computer, a handheld computer, or a similar device. In some implementations, administrative device 240 may receive call information from user device 210 and/or switching device 230. The call information may include, for example, user billing information, call routing information, call duration information, and/or information designating a user device 210 as a call originator or a call receiver.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
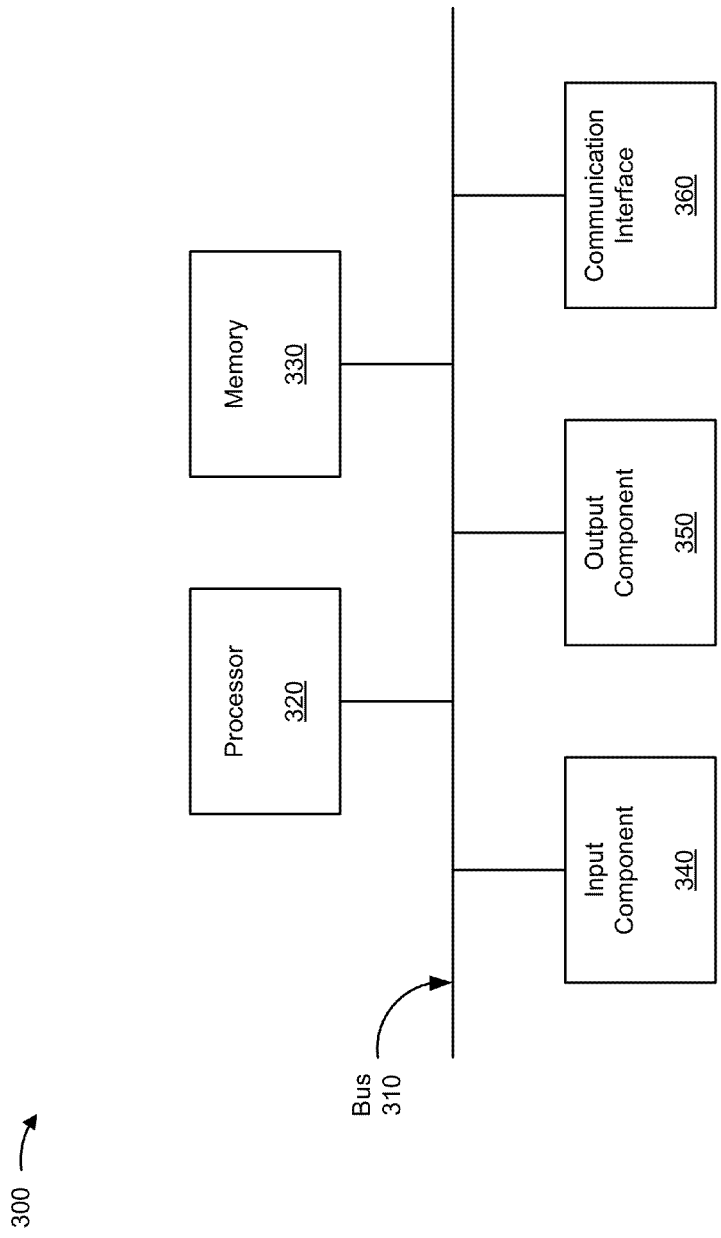
FIG. 3 is a diagram of example components of one or more devices of FIG. 2.

FIG. 3 is a diagram of example components of a device 300. Device 300 may correspond to user device 210, switching device 230, and/or administrative device 240. Additionally, or alternatively, each of user device 210, switching device 230, and/or administrative device 240 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g. a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
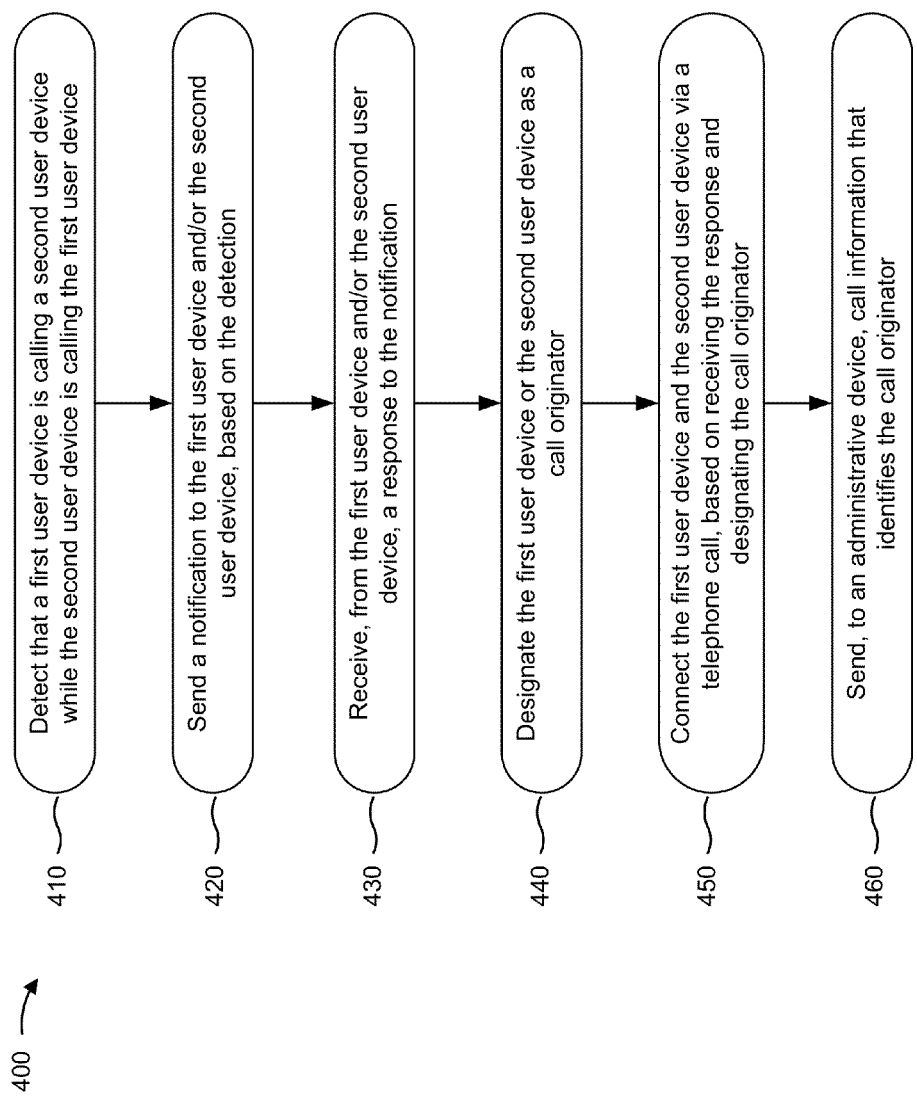
FIG. 4 is a flow chart of an example process for connecting user devices attempting to call one another at the same time.

FIG. 4 is a flow chart of an example process 400 for connecting user devices attempting to call one another at the same time. In some implementations, one or more process blocks of FIG. 4 may be performed by switching device 230. Additionally, or alternatively, one or more process blocks of FIG. 4 may be performed by another device or group of devices separate from or including switching device 230, such as administrative device 240 and/or user device 210.

As shown in FIG. 4, process 400 may include detecting that a first user device is calling a second user device while the second user device is calling the first user device (block 410). For example, switching device 230 may receive input indicating that a first user device 210 is attempting to call a second user device 210, and may receive coincident input indicating that the second user device 210 is attempting to call the first user device 210. Additionally, or alternatively, switching device 230 may receive input indicating that a first user device 210 is attempting to call a second user device 210, and may receive coincident input indicating that both the first user device 210 and the second user device 210 are off the hook, occupied, busy, engaged, attempting to connect on a call, and/or otherwise unavailable.

In some implementations, switching device 230 may receive, from a first user device 210, a first request to connect the first user device 210 on a call with a second user device 210 (e.g., to establish a call between the first user device 210 and the second user device 210). Switching device 230 may also receive, from the second user device 210, a second request to connect the second user device 210 on a call with the first user device 210 (e.g., to establish a call between the second user device 210 and the first user device 210). Based on receiving the first and second requests, switching device 230 may determine that a time period between receiving the first request and the second request satisfies a threshold (e.g., the first request and the second request are received within a particular time period). Based on the time period satisfying the threshold, switching device 230 may determine that the first user device 210 is calling the second user device 210 while the second user device 210 is calling the first user device 210.

In some implementations, switching device 230 may detect that the first user device 210 is an intended recipient of a first call from the second user device 210, and may detect that the second user device 210 is an intended recipient of a second call from the first user device 210. Switching device 230 may detect the first and second calls at the same time, within a particular time frame, while both user devices are engaged, or the like. Detecting a call may include receiving input from user device 210 requesting that switching device 230 connect user device 210 on a call. Additionally, or alternatively, detecting a call may include receiving input from a device capable of controlling the signaling communication between user devices 210 (e.g., a call agent), and/or may include receiving input from administrative device 240.

As further shown in FIG. 4, process 400 may include sending a notification to the first user device and/or the second user device, based on the detection (block 420). For example, switching device 230 may send a notification to the first user device 210 and/or the second user device 210, indicating that the first user device 210 is attempting to call the second user device 210, and/or indicating that the second user device 210 is attempting to call the first user device 210 (e.g., indicating that the first and second user devices 210 are attempting to call one another). In some implementations, switching device 230 may send the notification to the first and second user devices 210, or may send the notification to one of the first or second user devices 210 (e.g., may only send the notification to a user device 210 designated as a call originator or a call receiver).

In some implementations, the notification from switching device 230 may include call information (e.g., the name of the user making the call, billing information, etc.). Additionally, or alternatively, the notification from switching device 230 may include information requesting that a user of user device 210 indicate whether to connect the call, decline the call, send the call to voicemail, etc. Additionally, or alternatively, the notification from switching device 230 may include information requesting that a user of user device 210 designate the user device 210 as a call originator and/or a call receiver. For example, switching device 230 may send a notification to the first and/or the second user devices 210 indicating that the first and second user devices 210 are attempting to call one another, and requesting that a user of the first and/or second user devices 210 indicate whether to designate the first or the second user device 210 as the call originator or the call receiver.

In some implementations, switching device 230 may send the notification for display on user device 210 (e.g., on a display screen). For example, switching device 230 may send a text notification (e.g., information displayed by a smart phone application, information displayed by a web browser, a message sent via short message service ("SMS"), etc.), a picture notification (e.g., via a multimedia messaging service (MMS) text), and/or a video notification. Additionally, or alternatively, switching device 230 may send an audible notification. For example, switching device 230 may send an audio alert (e.g., a tone, a pitch, a chime, a harmony, etc.), a song, and/or a voice notification (e.g., a recorded voice message). Additionally, or alternatively, switching device 230 may send a notification via an automated voice response network, such as an interactive voice response ("IVR") system, and/or by use of a voice response unit ("VRU").

As further shown in FIG. 4, process 400 may include receiving, from the first user device and/or the second user device, a response to the notification (block 430). For example, switching device 230 may receive, from the first user device 210 and/or the second user device 210, a response indicating that a first user of the first user device 210 and/or a second user of the second user device 210 would like to connect for a call. Additionally, or alternatively, switching device 230 may receive, from the first user device 210 and/or the second user device 210, a response indicating that the first and/or second user would not like to connect for a call.

In some implementations, switching device 230 may receive, from the first user device 210 and/or the second user device 210, a response designating the first and/or second user device 210 as a call originator or a call receiver. For example, switching device 230 may receive a response to the notification indicating that the first user device 210 is to be designated as the call originator and/or that the second user device 210 is to be designated as the call receiver. Alternatively, switching device 230 may receive a response indicating that both user devices 210 are to be designated as the call originator. Alternatively, switching device 230 may receive a response indicating that both user devices 210 are to be designated as the call receiver.

A call originator may refer to the user device 210 placing a call to a call receiver. A call receiver may refer to the user device 210 receiving the call from the call originator. In some implementations, identifying the call originator and the call receiver may be useful for billing and/or accounting purposes.

In some implementations, switching device 230 may receive a response generated by a user of user device 210. For example, switching device 230 may receive information based on input into user device 210 by the user (e.g., a tone generated by input to a phone keypad, a user selection of a button on a touch screen, a user selection of a button on user device 210, text entered via an alphanumeric keyboard, information input into a smart phone application, etc.). Additionally, or alternatively, switching device 230 may receive a voice response, and may interpret the voice response using voice recognition technology. For example, switching device 230 may receive a voice response via an automated voice response network, such as an IVR system, and/or by use of a VRU.

As further shown in FIG. 4, process 400 may include designating the first user device or the second user device as a call originator (block 440). For example, switching device 230 may designate the first user device 210 or the second user device 210 as the call originator, for billing and/or accounting purposes. In some implementations, switching device 230 may randomly select a user device 210 to designate as a call originator. In some implementations, switching device 230 may designate the first user device 210 or the second user device 210 as the call originator based on information received from the first user device 210 and/or the second user device 210 (e.g., in the response to the notification, or in a response to an additional notification). For example, switching device 230 may receive, from a particular user device 210, an indication that the particular user device 210 is to be designated as the call originator. Based on this response, switching device 230 may designate the particular user device 210 as the call originator. Alternatively, switching device 230 may receive, from the particular user device 210, an indication that the particular user device 210 is to be designated as the call receiver. Based on this response, switching device 230 may designate the particular user device 210 as the call receiver.

Additionally, or alternatively, switching device 230 may use a business rule to determine a user device 210 to designate as the call originator. For example, if switching device 230 receives a response from both user devices 210 indicating that both user devices 210 are to be designated as the call originator or the call receiver, switching device 230 may use a business rule to determine which user device 210 to designate as the call originator. The business rule may indicate, for example, a user device 210 to designate as the call originator based on an order in which the responses from user devices 210 are received by switching device 230. For example, if both user devices 210 indicate that both user devices 210 are to be designated as the call originator, then the first user device 210 to respond to the notification may be designated as the call originator. Likewise, if both user devices 210 indicate that both user devices 210 are to be designated as the call receiver, then the first user device 210 to respond to the notification may be designated as the call receiver.

Additionally, or alternatively, switching device 230 may determine a user device 210 to designate as the call originator based on one or more additional responses received from the first and/or second user device 210. For example, switching device 230 may receive a first notification indicating that user devices 210 are to be connected, and may further receive a second notification indicating a user device 210 to designate as the call originator or the call receiver. Additionally, or alternatively, switching device 230 may receive a notification indicating that user devices 210 are to be connected, and may designate the call originator without further notification from user device 210 (e.g., switching device 230 may designate a user device 210 as the call originator based on call information and/or information included in the response to the first notification).

In some implementations, switching device 230 may designate the first user device 210 or the second user device 210 as the call originator based on call information. For example, if user devices 210 were recently connected for a previous call (e.g., within a particular time frame), switching device 230 may designate the same user device 210 as the call originator that had been the previous call originator in the previous call. Additionally, or alternatively, switching device 230 may determine that the previous call had been disconnected (e.g., a dropped call), and switching device 230 may designate the same user device 210 as the call originator that had been the previous call originator for the disconnected call. Additionally, or alternatively, switching device 230 may identify the first user device 210 or the second user device 210 as the call originator based on which user device 210 has the most favorable billing scheme (e.g., which user account has the most minutes remaining, which user account will be charged a lower rate for the call, etc.).

As further shown in FIG. 4, process 400 may include connecting the first user device and the second user device for a call, based on receiving the response and designating the call originator (block 450). For example, switching device 230 may receive a response from the first user device 210 and/or the second user device 210 indicating that the first user device 210 and the second user device 210 are to be connected. In this instance, switching device 230 may connect the first user device 210 and the second user device 210 for a call.

In some implementations, switching device 230 may receive an indication from the first user device 210 and/or the second user device 210 indicating a user device 210 to be designated as the call originator. In this instance, switching device 230 may designate the indicated user device 210 as the call originator, and may connect user devices 210 for a call. Alternatively, switching device 230 may receive an indication from the first user device 210 and the second user device 210 indicating that both user devices 210 are to be designated as call originators or call receivers. In this instance, switching device 230 may connect the first user device 210 and the second user device 210 for a call, and may designate the first user device 210 or the second user device 210 as the call originator based on a business rule. Additionally, or alternatively, when receiving an indication that both user devices 210 are to be designated as call originators or call receivers, switching device 230 may designate a user device 210 as the call originator or call receiver, and may further request that one or more users of user devices 210 confirm the designation of the user device 210 as the call originator or call receiver before connecting the call.

As further shown in FIG. 4, process 400 may include sending, to an administrative device, call information that identifies the call originator (block 460). For example, switching device 230 may send call information that indicates that the first or second user device 210 is the call originator. Additionally, or alternatively, switching device 230 may send call information that indicates that the first or second user device 210 is the call receiver. Additionally, or alternatively, switching device 230 may send other call information to administrative device 240. For example, switching device 230 may send call information that identifies a duration of the call, information associated with user device 210 (e.g., a type of user device 210, a user and/or user account associated with user device 210, etc.), billing information associated with user device 210 (e.g., minutes remaining, calling charge rates, etc.), an indication of whether the call is local or long distance, an indication of a type of call (e.g., voice or video), a service provider associated with user device 210, etc.

While a series of blocks has been described with regard to FIG. 4, the blocks and/or the order of the blocks may be modified in some implementations. Additionally, or alternatively, non-dependent blocks may be performed in parallel.

Figure 5A:
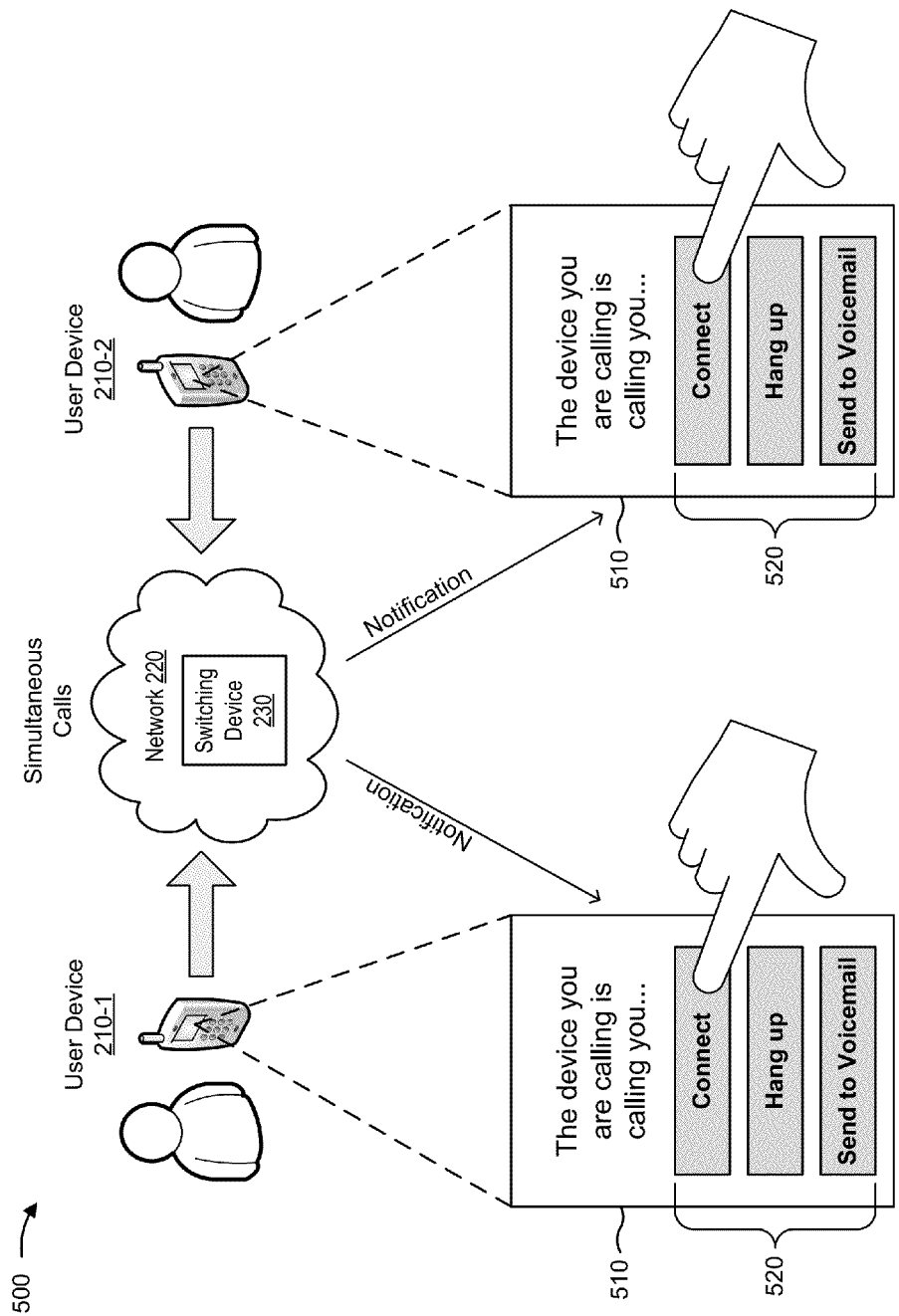
FIGS. 5A-5C are diagrams of an example implementation relating to the example process shown in FIG. 4.
Figure 5B:
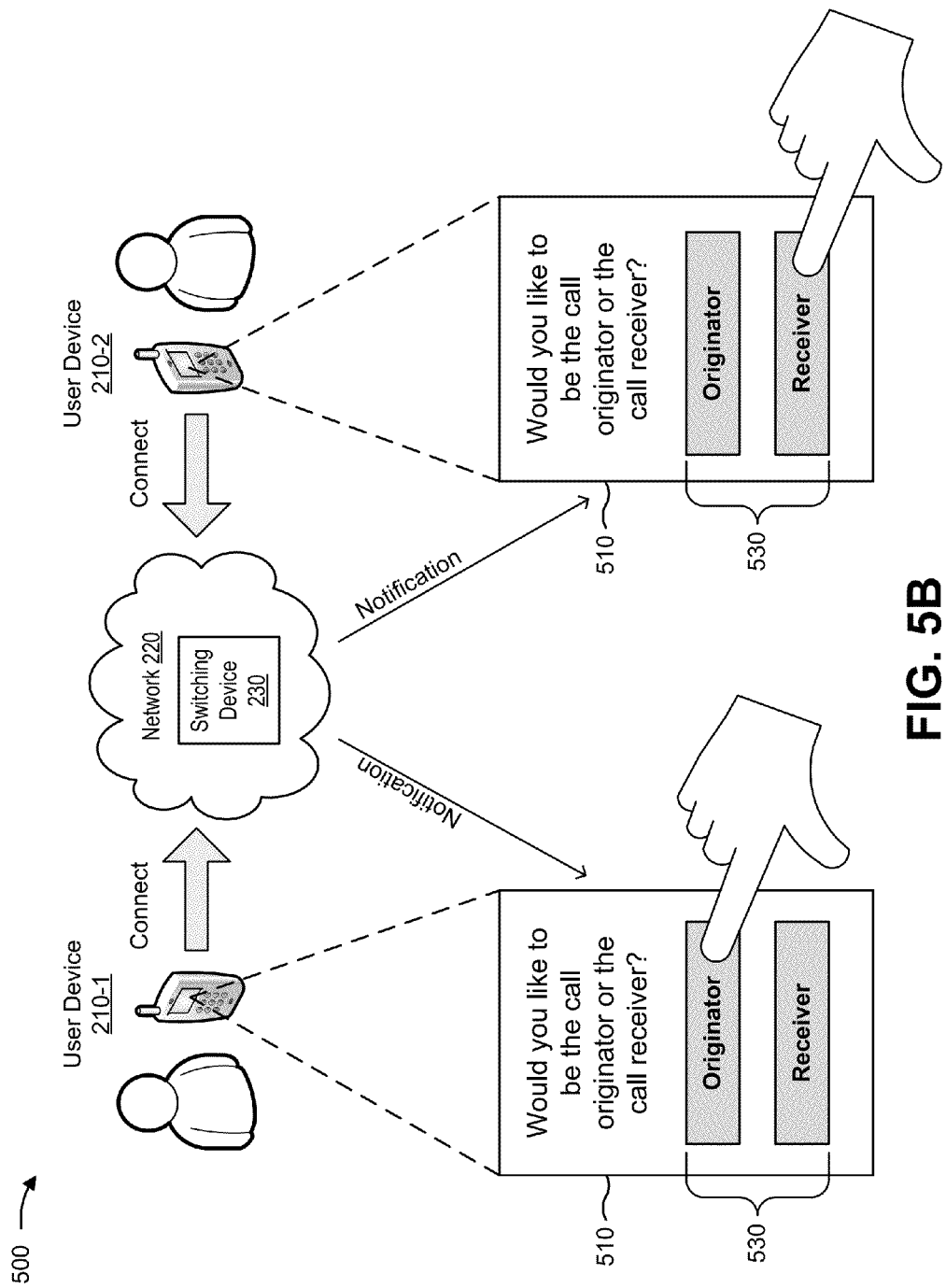
Figure 5C:
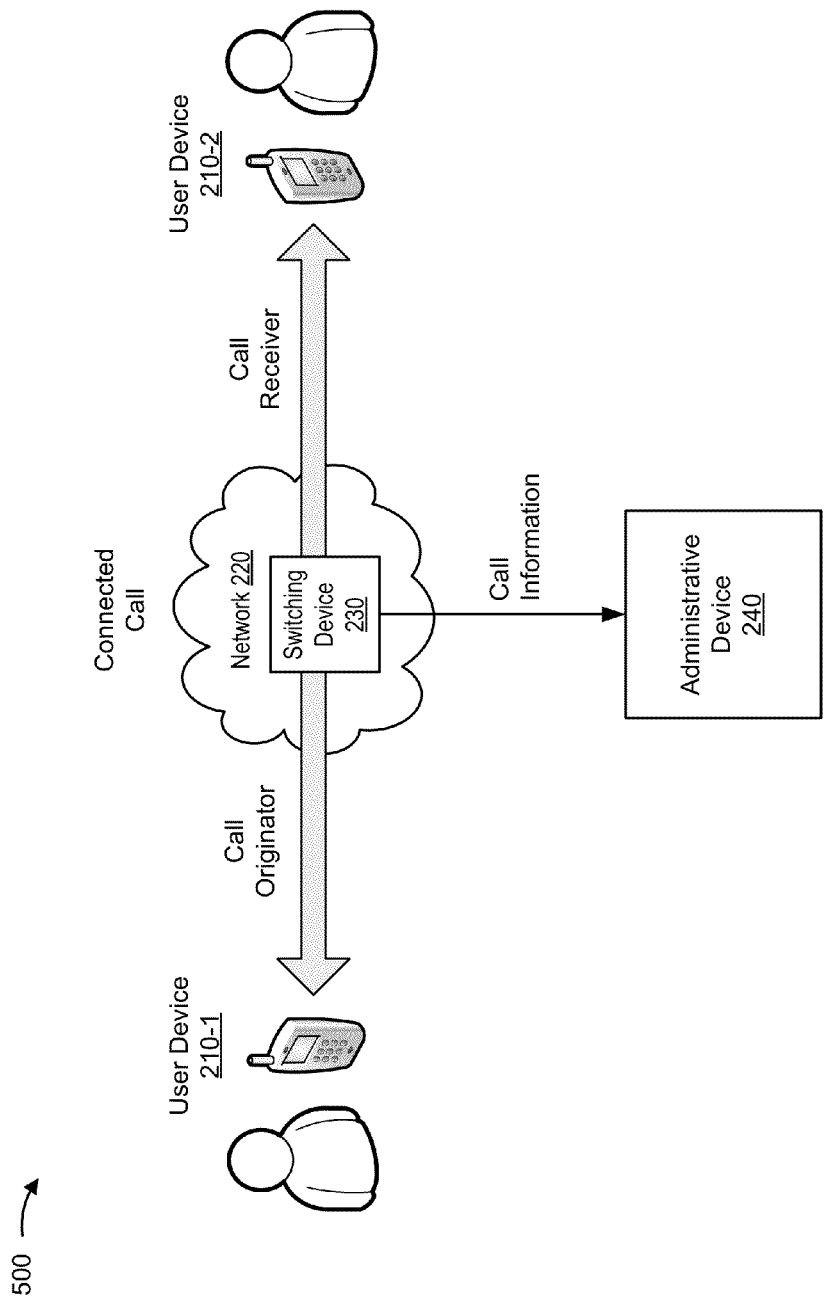

FIGS. 5A, 5B, and 5C are diagrams of an example implementation 500 relating to process 400 (FIG. 4). In example implementation 500, switching device 230 sends a notification for display on user devices 210, receives a response to the notification from user devices 210, connects user devices 210 for a call, and sends call information associated with the call to an administrative device 240.

As shown in FIG. 5A, switching device 230 may detect that a first user device 210-1 and a second user device 210-2 are calling one another, and may send a notification to the first user device 210-1 and the second user device 210-2 indicating that the first user device 210-1 and the second user device 210-2 are calling one another. For example, switching device 230 may send a notification for display on user devices 210-1 and 210-2. As shown by reference number 510, user devices 210-1 and 210-2 may display a text-based notification indicating that the first user device 210-1 is attempting to call the second user device 210-2 while the second user device 210-2 is attempting to call the first user device 210-1. Additionally, or alternatively, user device 210 may provide one or more input options, as shown by reference number 520. For example, user device 210 may provide input options that include an option to connect user devices 210-1 and 210-2, an option to decline to connect user devices 210-1 and 210-2 (e.g., hang up), and/or an option to send the incoming call to a message service (e.g., voicemail). When the users of user devices 210-1 and 210-2 select "Hang Up," switching device 230 may not connect user devices 210-1 and 210-2. Likewise, when the users of user devices 210-1 and 210-2 select "Send to Voicemail," switching device 230 may send the calls to a message service.

When users of user devices 210-1 and 210-2 select identical options, switching device 230 may connect the call, disconnect the call, or send the call to voicemail based on the selections received from user devices 210 (e.g., switching device 230 may connect the call when both users select "Connect," may disconnect the call when both users select "Hang Up," and may connect both user devices 210 to a voicemail service when both users select "Send to Voicemail").

When users of user devices 210-1 and 210-2 select different options, switching device 230 may select one of the options and ignore the other option. For example, a user of user device 210-1 may select "Connect," and a user of user device 210-2 may select "Hang Up." In this instance, switching device 230 may disconnect the call. Additionally, or alternatively, a user of user device 210-1 may select "Connect" or "Hang Up," and a user of user device 210-2 may select "Send to Voicemail." In this instance, switching device 230 may send the call from user device 210-1 to a voicemail service associated with user device 210-2. As shown in FIG. 5A, the users of user devices 210-1 and 210-2 have selected "Connect."

As shown in FIG. 5B, users who choose to connect user device 210-1 and 210-2 may receive additional input options from switching device 230. In some implementations, user device 210 may provide additional input options on a user interface, as shown by reference number 530. For example, the additional input options may include an option to designate user device 210 as the call originator, and/or an option to designate user device 210 as the call receiver. In some implementations, user device 210 may combine input options 520 and 530 (e.g., connect as originator, connect as receiver). As shown in FIG. 5B, a user of user device 210-1 has selected to become the call originator, and a user of user device 210-2 has selected to become the call receiver.

As shown in FIG. 5C, switching device 230 may designate a first user device 210-1 or a second user device 210-2 as the call originator, based on a response to the notification. For example, switching device 230 may designate the first user device 210-1 as the call originator based on the response to user input options received from user device 210-1 (e.g., user selection of "Originator"). Additionally, or alternatively, switching device 230 may designate the second user device 210-2 as the call receiver based on the response to user input options received from user device 210-2 (e.g., user selection of "Receiver"). After receiving a response to the notification, switching device 230 may connect the first user device 210-1 and the second user device 210-2 for a call, and may designate the first user device 210-1 as the call originator and the second user device 210-2 as the call receiver.

As further shown in FIG. 5C, switching device 230 may send call information to administrative device 240. Call information may include information that identifies a user device 210 as the call originator and information that identifies a user device 210 as the call receiver. In some implementations, call information may include information useful for billing and/or accounting purposes (e.g., call duration, call geographic origin, etc.). For example, switching device 230 may send information to administrative device 240 indicating that the first user device 210-1 is the call originator. After receiving, from switching device 230, call information designating the first user device 230-1 as the call originator, administrative device 240 may bill the first user device 210-1 for the call based on a call duration, a call location of user device 210-1, a call fee rate, long distance charges, etc.

Figure 6A:
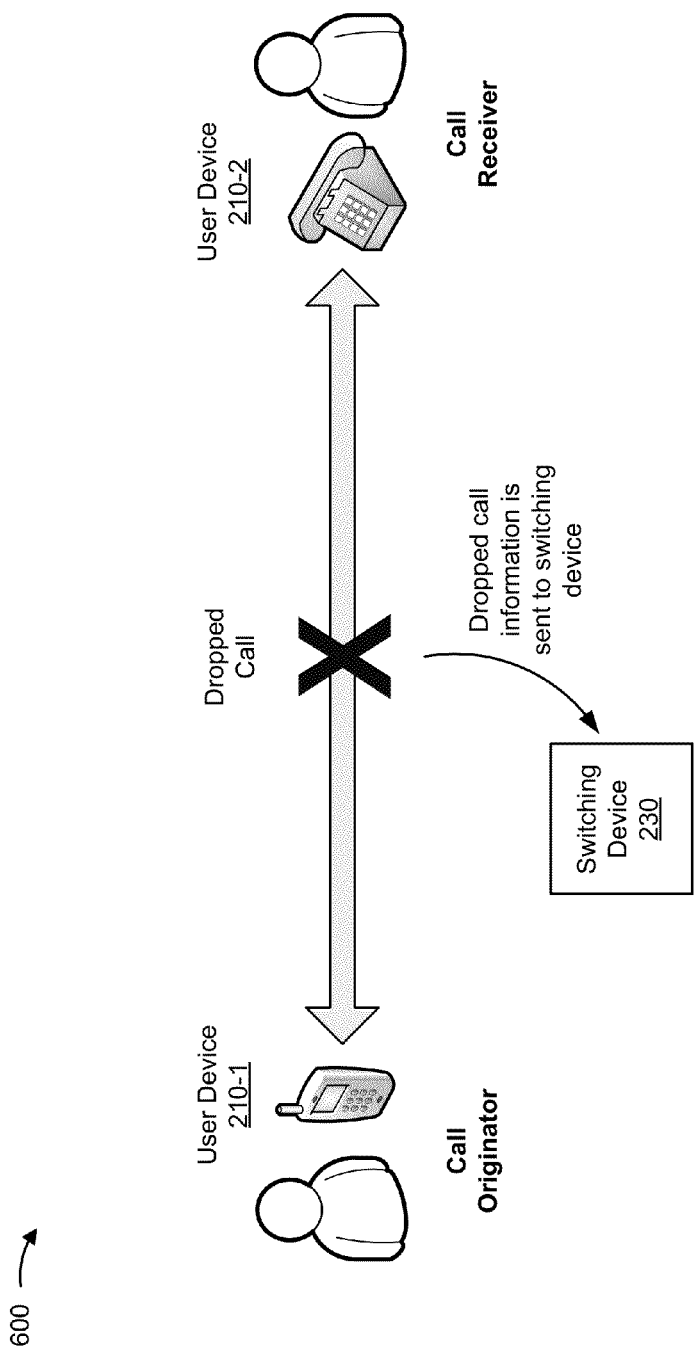
FIGS. 6A and 6B are diagrams of another example implementation relating to the example process shown in FIG. 4.
Figure 6B:
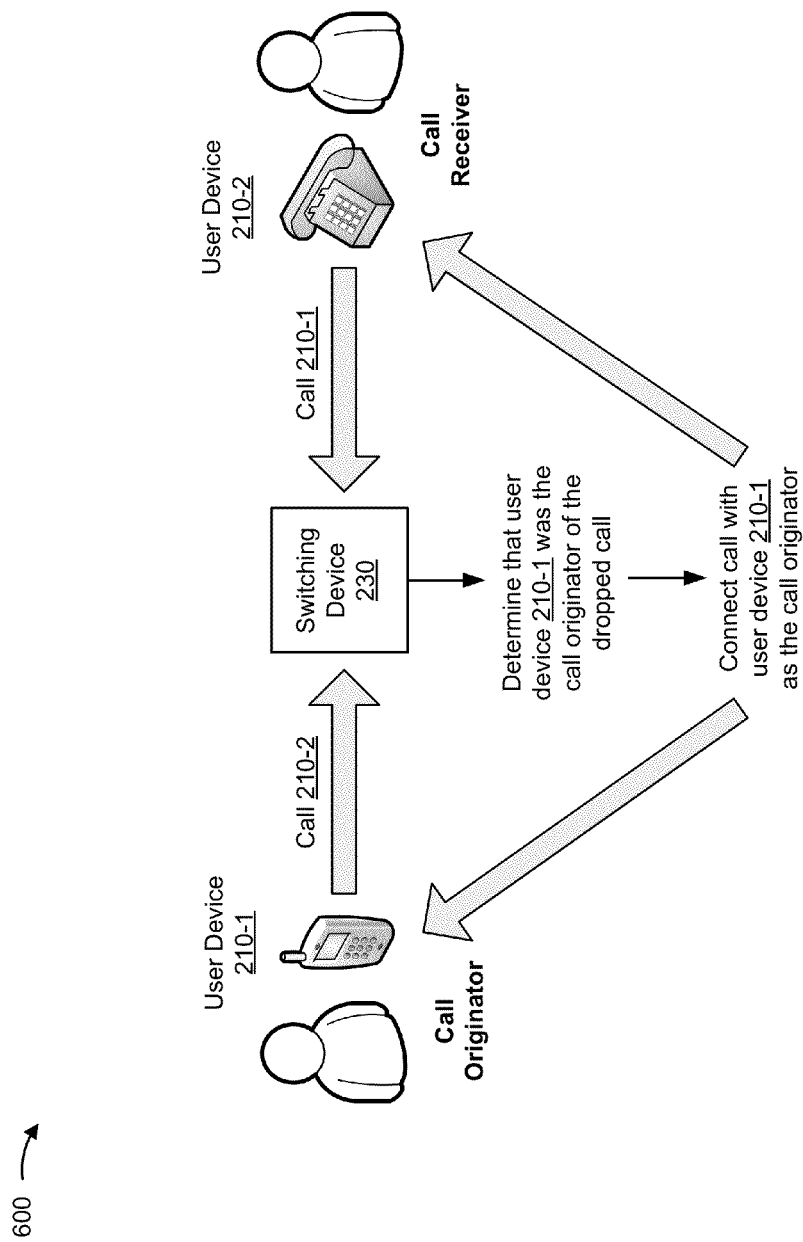

FIGS. 6A and 6B are diagrams of an example implementation 600 relating to process 400 (FIG. 4). In example implementation 600, switching device 230 may determine a call originator and a call receiver based on previous calling information associated with user devices 210.

As shown in FIG. 6A, a previous call between a first user device 210-1, identified as a previous call originator, and a second user device 210-2, identified as a previous call receiver, may terminate. For example, the previous call may terminate unexpectedly due to a lost connection (e.g., a dropped call). Switching device 230 may receive previous call information associated with the previous call, and may identify the first user device 210-1 as the previous call originator and the second user device 210-2 as the previous call receiver.

As shown in FIG. 6B, switching device 230 may detect that the first user device 210-1 is attempting to call the second user device 210-2 while the second user device 210 is attempting to call the first user device 210-1. In some implementations, switching device 230 may determine that user devices 210-1 and 210-2 were connected via a previous call (e.g., the dropped call). Based on the previous call information, switching device 230 may determine that the first user device 210-1 is the previous call originator of the previous call, and the second user device 210-2 is the previous call receiver of the previous call. Switching device 230 may connect the first user device 210-1 and the second user device 210-2 for a call and, based on the previous call information, switching device 230 may designate the first user device 210-1 as the call originator. In some implementations, switching device 230 may send call information to administrative device 240 indicating that the first user device 210-1 is the call originator.

The foregoing disclosure provides illustration and description, but is not intended to be exhaustive or to limit the implementations to the precise form disclosed. Modifications and variations are possible in light of the above disclosure or may be acquired from practice of the implementations.

Certain implementations have been described herein with respect to two user devices as an example. Some implementations may involve more than two user devices. For example, implementations described herein may be applied to three or more user devices on a conference call.

As used herein, the term "component" is intended to be broadly construed as hardware, firmware, or a combination of hardware and software.

Certain user interfaces have been described herein. In some implementations, the user interfaces may be customizable by a device. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
   one or more processors to:
   receive, from a first user device, a first request to connect the first user device to a second user device;
   receive, from the second user device, a second request to connect the second user device to the first user device;
   detect that the first user device is calling the second user device while the second user device is calling the first user device when the first request and the second request are received within a particular time period;
   send a notification to the first user device or the second user device based on detecting that the first user device is calling the second user device while the second user device is calling the first user device,
      the notification including an audible notification or a visual notification that indicates that the first user device and the second user device are calling one another;
   identify the first user device or the second user device as a previous call originator of a previous call between the first user device and the second user device,
      the previous call occurring prior to detecting that the first user device is calling the second user device while the second user device is calling the first user device;
   designate the first user device or the second user device as a call originator for the call based on identifying the first user device or the second user device as the previous call originator; and
   connect, based on the designating of the call originator, the first user device and the second user device for a call.

2. The device of claim 1, where the one or more processors are further to:
   receive a response to the notification,
   where the response indicates that the first user device or the second user device is to be designated as the call originator; and
   where the one or more processors, when designating the first user device or the second user device as the call originator, are further to:
   designate the first user device or the second user device as the call originator further based on the response.

3. The device of claim 1, where the one or more processors, when designating the first user device or the second user device as the call originator, are further to:
   designate the first user device or the second user device as the call originator further based on at least one of:
      a business rule;
      a billing plan associated with the first user device or the second user device;
      an amount of minutes remaining on the billing plan associated with the first user device or the second user device; or
      a billing charge associated with the call, and associated with the first user device or the second user device.

4. The device of claim 1, where the one or more processors are further to:
   send, to an administrative device, call information that identifies the first user device or the second user device as the call originator.

5. A non-transitory computer-readable medium storing instructions, the instructions comprising:
   one or more instructions that, when executed by at least one processor, cause the at least one processor to:
   receive, from a first user device, a first request to establish a connection with a second user device;
   receive, from the second user device, a second request to establish a connection with the first user device;
   detect that the first user device and the second user device are calling one another when the first request and the second request are received within a particular time period;
   send a notification to the first user device or the second user device based on detecting that the first user device and the second user device are calling one another,
      the notification including an audible notification or a visual notification that indicates that the first user device and the second user device are calling one another;
   identify the first user device or the second user device as a previous call originator of a previous call between the first user device and the second user device,
      the previous call occurring prior to detecting that the first user device and the second user device are calling one another;
   designate the first user device or the second user device as a call originator based on identifying the first user device or the second user device as the previous call originator; and
   connect, based on the designating of the call originator, the first user device and the second user device for a call.

6. The non-transitory computer-readable medium of claim 5, where the instructions further comprise:
   one or more instructions that, when executed by at least one processor, cause the at least one processor to receive a response to the notification,
   where the response to the notification indicates that the first user device or the second user device is to be designated as the call originator; and
   where the one or more instructions to designate the first user device or the second user device as the call originator comprise:
   one or more instructions that, when executed by at least one processor, cause the at least one processor to:
   designate the first user device or the second user device as the call originator further based on the response.

7. The non-transitory computer-readable medium of claim 5, where the one or more instructions to designate the first user device or the second user device as the call originator comprise:
   one or more instructions that, when executed by at least one processor, cause the at least one processor to:
   designate the first user device or the second user device as the call originator further based on at least one of:
      a business rule;
      a billing plan associated with the first user device or the second user device;
      an amount of minutes remaining on the billing plan associated with the first user device or the second user device; or
      a billing charge associated with the call, and associated with the first user device or the second user device.

8. The non-transitory computer-readable medium of claim 5, where the instructions further comprise:
one or more instructions that, when executed by the at least one processor, cause the at least one processor to:
send, to an administrative device, call information that identifies the first user device or the second user device as the call originator.

9. A method comprising:
receive, by a device and from a first user device, a first request to connect the first user device and a second user device;
receive, by the device and from the second user device, a second request to connect the second user device and the first user device;
detecting, by the device, that the first user device is calling the second user device while the second user device is calling the first user device when the first request and the second request are received within a particular time period;
sending, by the device, a notification to the first user device or the second user device based on detecting that the first user device is calling the second user device while the second user device is calling the first user device,
the notification indicating that the first user device and the second user device are calling one another;
designating, by the device, the first user device or the second user device as a call originator based on identifying the first user device or the second user device as the previous call originator; and
establishing, by the device and based on the designating of the call originator, a connection between the first user device and the second user device for a call.

10. The method of claim 9, where the method further comprises:
receiving a response to the notification,
where the response indicates that the first user device or the second user device is to be designated as the call originator; and
where designating the first user device or the second user device as the call originator further comprises:
designating the first user device or the second user device as the call originator further based on the response.

11. The method of claim 9, where designating the first user device or the second user device as the call originator further comprises:
designating the first user device or the second user device as the call originator further based on at least one of:
a business rule;
a billing plan associated with the first user device or the second user device;
an amount of minutes remaining on the billing plan associated with the first user device or the second user device; or
a billing charge associated with the call, and associated with the first user device or the second user device.

12. The method of claim 9, further comprising:
sending, to an administrative device, call information that identifies the first user device or the second user device as the call originator.

13. The method of claim 9, further comprising:
receiving, from the first user device or the second user device, a response to the notification before establishing the connection.

14. The method of claim 13, where the notification includes a question regarding whether to establish the connection between the first user device and the second user device, and
where the response includes an affirmative reply to the question.

15. The method of claim 9, where sending the notification comprises:
sending the notification to one of the first user device or the second user device that is designated as the call originator.

16. The device of claim 1, where, when sending the notification, the one or more processors are to:
send the notification to the first user device, and
send the notification to the second user device.

17. The device of claim 1, where the one or more processors are further to:
receive, after sending the notification, information based on input entered by a user of the first user device or the second user device,
the first device and the second device being connected further based on the information.

18. The device of claim 1, where the one or more processors are further to:
send, to an administrative device, call information associated with the call, the call information including one or more of:
information that identifies the first user device or the second user device as a call receiver,
information identifying a duration of the call,
information associated with at least one of the first user device or the second user device,
information identifying a type of the call, or
information that identifies a service provider associated with the call.

19. The non-transitory computer-readable medium of claim 5, where the instructions further comprise:
one or more instructions that, when executed by the at least one processor, cause the at least one processor to:
send, to an administrative device, call information that identifies the first user device or the second user device as a call receiver.

20. The non-transitory computer-readable medium of claim 5, where the instructions further comprise:
one or more instructions that, when executed by the at least one processor, cause the at least one processor to:
receive, from the first user device, first information identifying a first selection of a first option,
receive, from the second user device, second information identifying a second selection of a second option that is different from the first option, and
choose the first option based on the first information and the second information,
the first option being to connect the first user device and the second user device for the call.

* * * * *